Aug. 18, 1942.    C. H. DUFFY    2,293,051
LABORATORY FILTERING SYSTEM
Filed Jan. 27, 1941
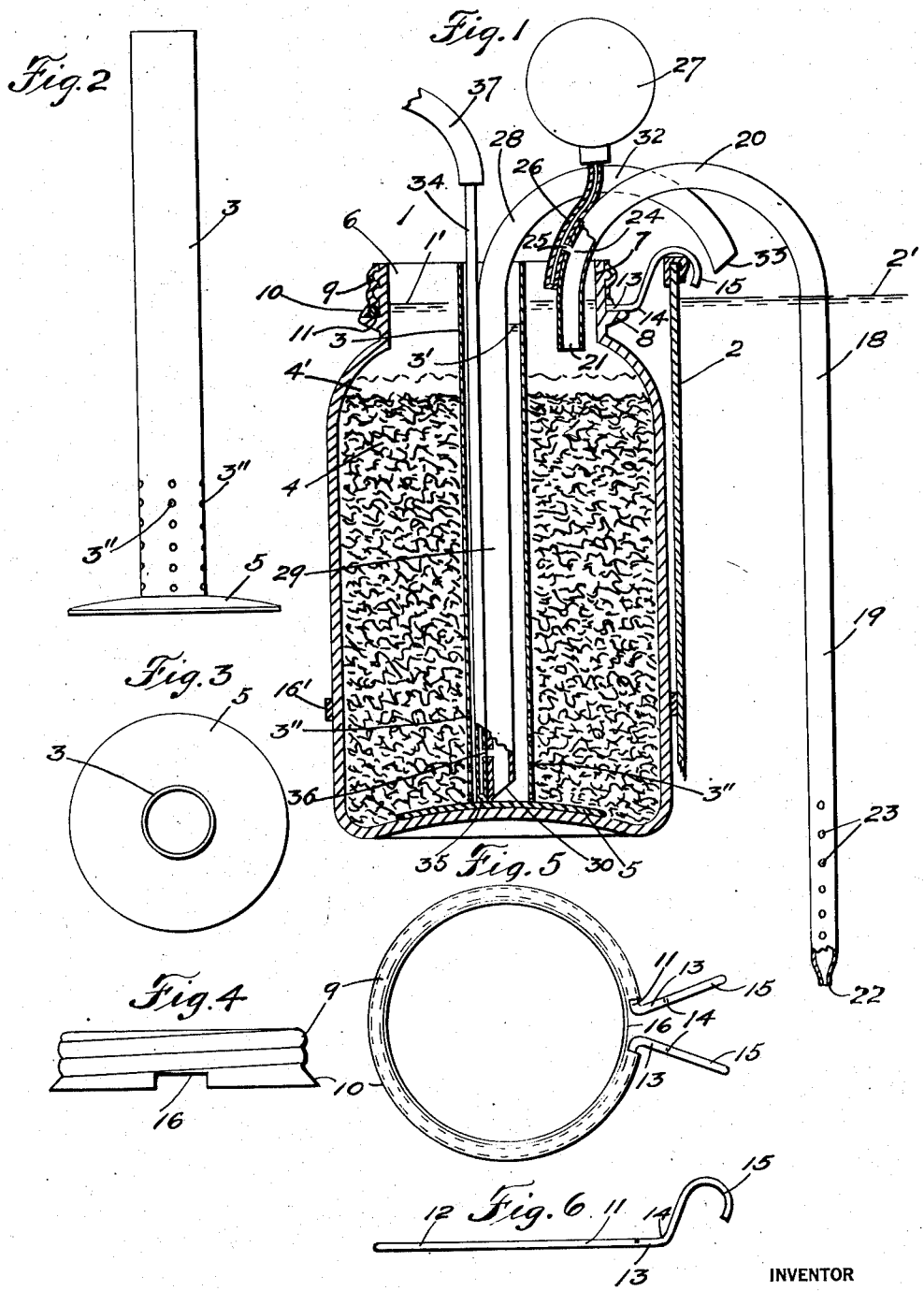
INVENTOR
Charles Hugh Duffy.
BY
ATTORNEY Patented Aug. 18, 1942

2,293,051

UNITED STATES PATENT OFFICE 2,293,051

LABORATORY FILTERING SYSTEM

Charles Hugh Duffy, Miami, Fla.

Application January 27, 1941, Serial No. 376,121

5 Claims. (Cl. 210—124)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

This invention relates to devices for filtering liquids, but more particularly to a water filter, which is particularly useful for filtering the water contained in small tanks, or containers and is therefore applicable to laboratory use or, for example, for filtering the water of fish tanks or aquariums and the like.

The invention has for its object to provide a water filter for filtering the water in small tanks or containers, wherein the parts of the filter are constructed and arranged so that they are applicable to and may be used in connection with the cheap and easily obtainable glass jars, such as the usual "Mason" jar commonly employed for preserving fruits and for general culinary use.

The invention consists of the novel construction and arrangement of parts and particularly in the construction and arrangement of the central tube which receives the water after it has percolated through the carbon or other filtering material and is in position and condition in said central tube for being discharged from the filtering device.

The invention also consists of the novel construction and arrangement of the parts for attaching the filtering device to a tank or container, the contents of which are to be filtered.

Referring to the accompanying drawing:

Figure 1 is a vertical transverse sectional view through the filtering device and a portion of the wall of a tank or container, some of the elements being shown partly in elevation and partly in section.

Figure 2 is an elevation of the central receiving tube.

Figure 3 is a top plan view of the same.

Figure 4 is a side elevation of the threaded ring at the top of the filtering device.

Figure 5 is a top plan view of the same showing the filter suspending element in position under the threaded ring, and Figure 6 is a side elevation of the filter suspending member.

Like numerals of reference indicate the same parts throughout the several figures in which:

1 indicates the filtering device, and 2 indicates the adjacent wall or side of a tank or receptacle, the water contents of which are to be filtered. 2' indicates the level of the water in such tank or receptacle, and 1' indicates the level which the water from the tank 2 will assume in the filtering device, while 3' indicates the level which the water in the central receiving tube may be expected to assume.

3 indicates the central receiving tube into which the water enters after it has percolated through the carbon or other filtering material 4.

This central receiving tube 3 is preferably cylindrical in cross-section and open at its top, while it is permanently mounted on a slightly concavo-convex disk 5, of a diameter which will just permit it to pass through the mouth or neck of the filter receptacle 6. The tube 3 is also provided in its lower portion with a series of perforations 3".

This filter receptacle 6 may be a standard "Mason" glass preserving jar having the usual externally threaded top or neck 7 and gasket supporting flange 8, or it may be a jar which is interchangeable with a standard "Mason" glass jar as far as its depth and top 7 is concerned. At any rate such jars are preferable because of their cheapness and availability, but obviously any other suitable jar or container of glass or other suitable material may be employed.

Referring to Figures 4 and 5, 9 indicates the threaded metallic ring which threads down on the threaded top or neck 7 of the jar 6. This metallic ring 9 is conveniently made from a standard "Mason" jar cap, by cutting out the flat top portion of the cap, so as to leave only the threaded ring 9 thereof. This threaded ring 9 has the usual flared or flanged bottom edge 10 which has for its normal and conventional purpose to cooperate with a resilient packing gasket commonly positioned on the flange 8 of the "Mason" jar top or neck.

Referring to Figures 5 and 6, 11 indicates the filter-suspending element, which, in the example shown, consists of a stiff wire to form a ring 12 to conform to the diameter of the threaded top or neck 7 of the jar 6 and to rest upon the flange 8 of said top or neck 7 and under the flared or flanged bottom edge 10 of the threaded metallic ring 9. The meeting portions 13 of this wire ring 12 are bent outwardly a short distance to the points 14, where they are bent upwardly a short distance and then curved downwardly to form two adjacent hooks 15.

Referring again to the threaded metallic ring 9 (Figs. 4 and 5), it will be seen that its flared or flanged bottom edge 10 has a portion thereof cut out at 16, so as to permit the two meeting portions 13 of the wire ring 12 to pass out from under the flared or flanged bottom edge of the threaded ring 9, while the body of the wire ring 12 is snugly retained between the flange 8 on the top or neck of the jar 6 and the flared or flanged bottom edge 10 of the threaded metallic ring 9, as shown in the drawing.

Since the tank or container 2 may be of glass, and the filtering device is attached thereto by engaging the hooks 15 over the top edge of said receptacle 2, it is preferred that a soft and resilient ring 16' of a suitable material such as sponge rubber be applied around the exterior of the jar 6 to guard against fracture of the glass tank or container by the jar 6.

Referring now to the operative elements of the filter 1 (Fig. 1), the wall of the central receiving tube 3 is provided for a short distance from its bottom end with a series of small perforations 3'', the same being preferably smaller than the particles of carbon or other filtering material employed, so that while the water which percolates through such filtering material may freely enter the said receiving tube 3, the filtering material 4 will be excluded.

18 indicates the siphon tube which comprises a relatively long leg 19 which extends down into the water in the tank 2 and a U bent portion 20 terminating in a downwardly projecting open end 21 positioned within the top or neck 7 of the filter jar or receptacle 6, and also terminating at a point therein which is at a lower level than the water level 2' of the tank 2.

This siphon tube 18, if not provided with a fully open end on the long leg 19, may have its end 22 restricted, as shown in Figure 1, and provided in the wall of its lower portion with a plurality of small perforations 23, so as to allow free access of the water in the tank 2 into the tube 18, but will exclude therefrom matter of a size likely to clog the tube and prevent the free siphonic flow of water therein.

In operation the siphonic action of the siphon tube 18 may be started in order to deliver the water from the tank 2 into the filter receptacle 6, by filling the tube 18 with water and placing one's finger over the end 21 of the U bend 20 and then releasing the finger from said end when it is in the mouth of the filter receptacle at a level lower than the water level 2' in the tank 2. Or at a point 24 in the U bend 20 and adjacent the end 21 of the tube, a perforation 25 in the wall of the tube may be provided, and a small tube 26 may be attached to the tube 18, so that the bore of the small tube 26 communicates with the said perforation 25 and with the interior of the siphon tube 18. A simple atomizer bulb 27 being connected to the top end of the small tube 26, the siphonic action may be started through the siphon tube 18, by expelling the air from the bulb 27, then placing one's finger over the end 21 of the U bend at a level below the water level 2' in the tank 2. By releasing the bulb 27, water will be drawn up to fill the entire tube 18, and upon release of the finger from the end 21, the siphonic action will be started.

Referring now to the water-return tube 28 (Figure 1) it will be seen that it consists of a relatively long leg 29 having an open lower end 30. The upper portion 32 of this water-return tube 28 is bent in U formation so that the open end 33 thereof extends over the edge of the tank 2, as shown in Figure 1.

Attached to the leg 29 of the water-return tube 28 and extending lengthwise thereof, is a small air-supply tube 34 which has its lower end 35 closed and which communicates with the interior of the water-return tube 28 through complementary perforations 36 formed in the adjacent walls of the two tubes close to the open end 30 of the water-return tube 28. There is shown in Figure 1 attached to the upper end of the air-supply tube 34, a preferably flexible rubber tube 37 which leads from a small air-pump or other source of air supply (not shown) which furnishes air under slight pressure to the interior of the water-return tube 28 through the said complementary perforations 36.

To assemble the filtering device 1, the means for attaching the filter jar or receptacle 6 to the tank 2 as previously described are applied to the top or neck of the filter jar or receptacle 6.

The central water-receiving tube 3 with its attached disk 5 is then inserted into the jar or receptacle 6, the disk 5 being preferably concaved on its lower face to conform substantially to the usual slightly convex bottom of a standard "Mason" or other jar. This disk 5 effectually supports the central water-receiving tube 3 in vertical position within the jar 6.

The granulated carbon or other filtering material 4 is then placed in the jar and down upon the disk 5 of the water-receiving tube 3, thus effectually anchoring the disk 5 and tube 3 in proper effective operative position within the jar 6, and preventing any upward or lateral movement or displacement of the central water-receiving tube 3. This anchoring of the water-receiving tube 3 by the carbon or other filtering material within the jar 6 is the principal function of the disk 5, while in addition, it also closes the bottom of the water-receiving tube against the entrance of the filtering material therein.

It is good practice to cover the top surface of the filtering material with a thin layer of raw cotton 4', which is sufficient to localize thereon the larger particles in the water received into the filtering device and prevent their entrance into the filtering material proper. This layer of cotton 4' may be periodically removed and replenished and thus prevent frequent removal of the filtering material proper for washing or renewal.

The central water-receiving tube 3 being thus anchored in the filtering jar 6 by the filtering material resting upon its disk 5, the water-return tube 28 with its attached air tube 34 is then inserted into the water-receiving tube 3 as shown in Figure 1, and the air-supply tube 37 is attached to the air tube 34. The siphon tube 18 is then placed in position and the siphonic action started as previously described so that water is delivered from the tank 2 into the filtering device. The water thus delivered on top of the filtering material percolates through the filtering material down to the bottom thereof and the water thus filtered then enters the water-receiving tube 3 through the perforations 3'' in its wall near the bottom thereof. The filtered water thus rises in the water-receiving tube 3 and within the water-return tube 28 to a level above the point of entrance of air through the perforations 36 and is lifted in the water-return tube 28 by the air pressure so introduced into the tube 28 and is discharged from the water-return tube 28 back into the tank 2.

This circulation of water from the tank 2 through the filtering device and back into the tank will continue uninterrupted as long as air pressure is supplied to the air tube 34, and will cease as soon as the supply of air is stopped, at which time the siphoning action of the siphon tube 18 will also stop when the level 1' of the water in the filtering device has been established exactly equal to the level 2' of the water in the tank 2. This exact balance prevents the water from overflowing the mouth or top of the filtering jar or receptacle, and will be maintained until air pressure is again supplied to the air tube 34. This will again start the flow of filtered water through and out of the water-return tube 28 and lower the water level in the jar or container 6, which will again start the siphonic flow through the siphon tube 18 and again bring the filter into operation.

For small filters in which the receptacle 6 is, for instance a standard quart "Mason" jar, the siphon tube 18 and water-return tube 28 may be of Celluloid having an internal diameter of about $\frac{7}{16}$", while the central water-receiving tube 3 may be of like material having an internal diameter only sufficient to permit the entrance therein of the water-return tube 28 with its attached air tube 34.

Having thus described the invention, and what I consider to be a satisfactory example of one form of construction employed to produce the desired results, it is obvious that the component parts may be changed and altered in size, shape and arrangement without departing from the scope and spirit of the invention, and I consider myself clearly entitled to all such changes and modifications as fall within the limit and scope of the following claims:

What I claim is:

1. A liquid filtering device including a filter receptacle for containing the filtering material and means for supporting the receptacle adjacent a tank or container, the liquid contents of which are to be filtered, a siphon tube adapted to have its long leg within the liquid in the tank to be filtered and its short leg within the mouth of the filter receptacle, a central liquid receiving tube within the filter receptacle, an anchoring flange at the bottom of the central liquid receiving tube adapted to rest on the bottom of the filter receptacle and adapted to be positioned under the filtering material in said receptacle in such manner that the central liquid receiving tube is maintained in its effective upright position and against lateral or vertical movement by the filtering material within the filter receptacle and resting upon the anchoring flange, the said central liquid receiving tube being provided with a series of perforations in its lower portion whereby the liquid which percolates through the filtering material may enter the central liquid receiving tube and the filtering material be excluded therefrom, a liquid return tube having a long leg disposed within the central liquid receiving tube, and a bent portion having a depending end extending over the top of the tank the contents of which are being filtered, whereby the filtered liquid in the central liquid receiving tube may pass through said liquid return tube back into the tank, the contents of which are being filtered, and means connected to said liquid return tube through which air pressure may be introduced into said liquid return tube at a point in said tube below the level of the liquid in the central liquid receiving tube, whereby the liquid in the liquid return tube may be raised therein and discharged back into the tank, the contents of which are being filtered, the whole arranged whereby the siphonic action of the siphon tube will continue to deliver the liquid to be filtered to the filter receptacle and the liquid return tube will continue to return the filtered liquid from the central liquid receiving tube in the filter receptacle to the tank, the contents of which are being filtered as long as air pressure is supplied to the liquid return tube and such action will cease as soon as the liquid return tube is relieved of such air pressure.

2. A liquid filtering device including a filter receptacle for containing the filtering material adapted to be positioned adjacent a tank or container, the liquid contents of which are to be filtered, a siphon tube adapted to have its long leg within the liquid in the tank to be filtered and its short leg within the mouth of the filter receptacle, a central liquid receiving tube within the filter receptacle, an anchoring flange at the bottom of the central liquid receiving tube and adapted to be positioned under the filtering material in said receptacle in such manner that the central liquid receiving tube is maintained in its effective upright position and against lateral or vertical movement by the filtering material within the filter and resting upon the anchoring flange, the said liquid receiving tube being provided with means in its lower portion to permit the liquid which percolates through the filtering material to enter the central liquid receiving tube to the exclusion of the filtering material, a liquid return tube having a long leg disposed within the central liquid receiving tube and a bent portion having a depending end extending over the top of the tank, the contents of which are being filtered, whereby the filtered liquid in the central liquid receiving tube may be returned to the tank, the contents of which are being filtered, and means connected to said liquid return tube through which air pressure may be introduced into said liquid return tube at a point in said tube below the level of the liquid in the central liquid receiving tube, whereby the liquid in the liquid return tube may be raised therein and discharged back into the tank, the contents of which are being filtered.

3. A liquid filtering device including a filter receptacle for containing the filtering material and adapted to be positioned adjacent a tank or container, the liquid contents of which are to be filtered, a siphon tube having a long leg adapted to extend within the liquid in the tank to be filtered and its short leg within the mouth of the filter receptacle, a central liquid receiving tube within the filter receptacle, an anchoring flange at the bottom of the central liquid receiving tube and adapted to be positioned under the filtering material in said filter receptacle in such manner that the central liquid receiving tube is maintained in its effective upright position and against lateral or vertical movement by the filtering material resting upon the anchoring flange, the said liquid receiving tube being provided with means in its lower portion to permit the liquid which percolates through the filtering material to enter the central liquid receiving tube, a liquid return tube having one end disposed within the central liquid receiving tube and its other end extending over the top of the tank, the contents of which are being filtered, and means for introducing air pressure into said liquid return tube, whereby the liquid in the liquid return tube is discharged therefrom and into the tank, the contents of which are being filtered.

4. A liquid filtering device including a filter receptacle for containing the filtering material, a siphon tube having a long leg adapted to extend into the liquid to be filtered and its short leg within the mouth of the filter receptacle, a central liquid receiving tube within the filter receptacle, an anchoring flange at the bottom of the central liquid receiving tube and adapted to be positioned under the filtering material in said filter receptacle in such manner that the central liquid receiving tube is maintained in its effective upright position and against lateral or vertical movement by the filtering material resting upon the anchoring flange, the said liquid receiving tube being adapted to receive the liquid which percolates through the filtering material, a liquid return tube having one end disposed within the central liquid receiving tube to receive the filtered liquid within the central liquid receiving tube, and means for introducing air pressure into said liquid return tube to discharge the filtered liquid from the filtering device.

5. A liquid filtering device including a filter receptacle for containing the filtering material, a siphon tube for delivering the liquid to be filtered into the filter receptacle, a central liquid receiving tube within the filter receptacle and including means adapted to be engaged by the filtering material within the filter receptacle for anchoring the central liquid receiving tube against lateral or vertical movement, the said central liquid receiving tube being adapted to receive the filtered liquid after it has percolated through the filtering material, and a liquid return tube within the central liquid receiving tube to receive the filtered liquid within the central liquid receiving tube and discharge the filtered liquid from the filtering device.

CHARLES HUGH DUFFY.